Figure 1:
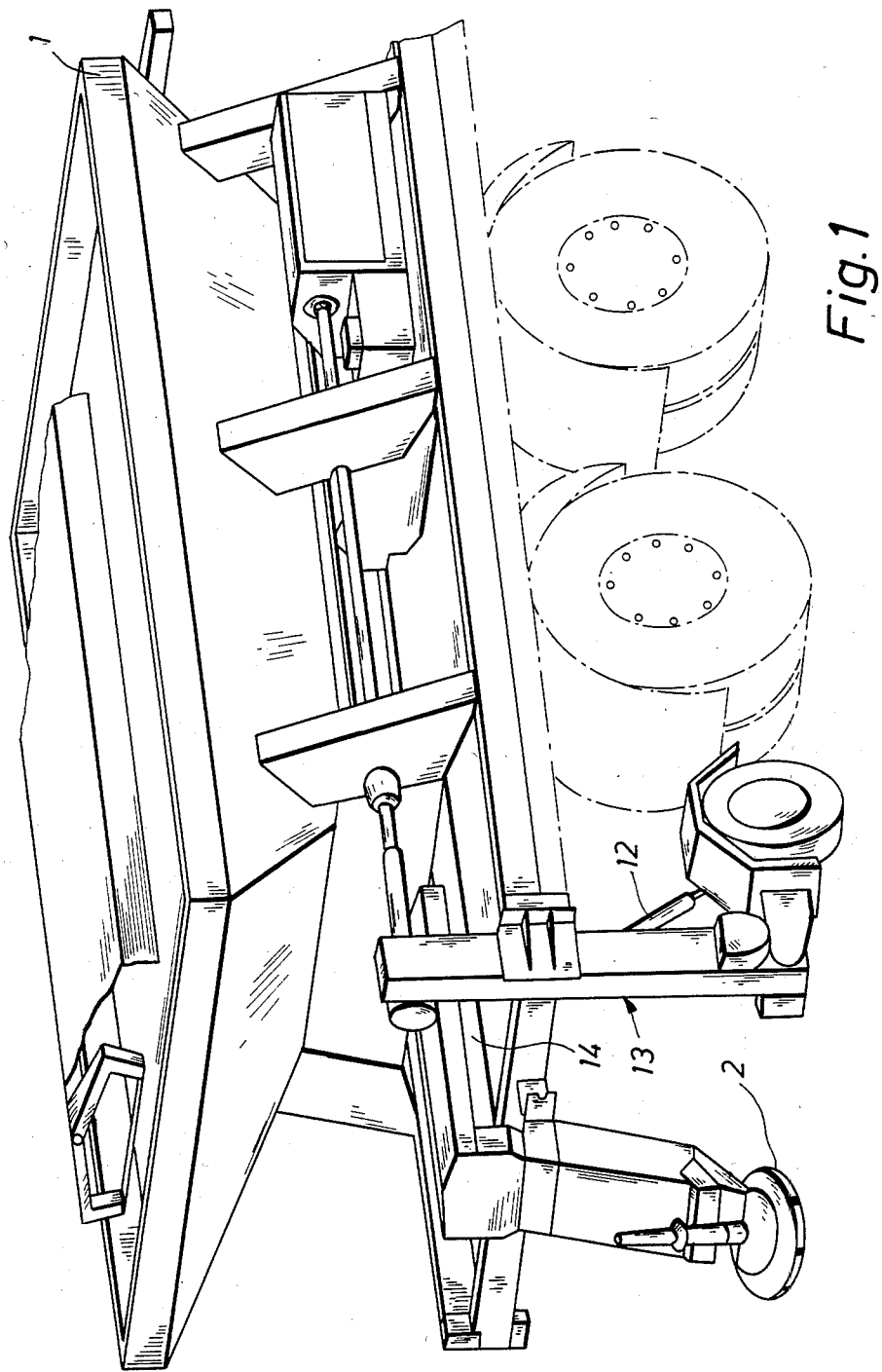

United States Patent [19]

Petersen

[11] Patent Number: 4,558,824
[45] Date of Patent: Dec. 17, 1985

[54] MATERIAL SPREADING VEHICLE WITH HYDRAULIC WHEEL PUMP

[75] Inventor: Jens Petersen, Vamdrup, Denmark
[73] Assignee: K/S Epoke, Vejen, Denmark
[21] Appl. No.: 680,608
[22] Filed: Dec. 12, 1984

Related U.S. Application Data

[63] Continuation of Ser. No. 443,890, Nov. 23, 1982, abandoned.

[51] Int. Cl.⁴ .......................... A01C 17/00; B05B 9/06
[52] U.S. Cl. ........................................ 239/684; 239/157
[58] Field of Search ................................ 239/156–158, 239/684, 685; 280/47; 180/53.4, 133, 165; 172/7, 12, 239, 413; 415/73

[56] References Cited

U.S. PATENT DOCUMENTS

| | | | |
|---|---|---|---|
| 3,019,025 | 1/1962 | Young | 239/685 |
| 3,414,200 | 12/1968 | Savory | 239/685 |
| 3,693,838 | 9/1972 | Haker et al. | 239/155 |
| 4,280,663 | 7/1981 | Thomsen | 239/685 |

FOREIGN PATENT DOCUMENTS

| | | | |
|---|---|---|---|
| 2738263 | 3/1978 | Fed. Rep. of Germany | 239/156 |
| 719530 | 7/1976 | U.S.S.R. | 239/685 |
| 728751 | 5/1980 | U.S.S.R. | 239/156 |
| 808029 | 2/1981 | U.S.S.R. | 239/685 |

Primary Examiner—Andres Kashnikow
Assistant Examiner—Kevin Patrick Weldon
Attorney, Agent, or Firm—Cushman, Darby & Cushman

[57] ABSTRACT

A spreading apparatus to be placed on a vehicle and comprising a container, from which the spreading material can be distributed through a dosing device, and a velocity sensing driving wheel placed at the rear end of the vehicle. The driving wheel may be lowered into contact with the roadway and is adapted to drive the dosing device and possibly also a spreading disc through an energy transferring device. The energy transferring device is provided by means of a hydraulic wheel pump coupled to the wheel, said hydraulic wheel pump feeding pressurized liquid through a liquid conduit to one or more hydraulic motors driving a plurality of stirrer and delivery rolls. According to the invention the pressurized liquid is also fed to a piston in a cylinder, which when the pressure in the conduit has been reduced to a predetermined value due to an empty material container or as a consequence of the spreading being decoupled, implies that the wheel is no longer pressed against the roadway. In this manner an unnecessary operation of the machinery is avoided.

1 Claim, 6 Drawing Figures

MATERIAL SPREADING VEHICLE WITH HYDRAULIC WHEEL PUMP

This is a continuation, of application Ser. No. 443,890, filed Nov. 23, 1982 abandoned.

The invention relates to a spreading apparatus to be placed on a vehicle and comprising a container from which the spreading material is fed through a dosing device and possibly also a spreading disc hydraulicly driven, and a velocity sensing driving wheel placed at the rear end of the vehicle and capable of being pressed against the roadway by adjustable hydraulic power, said driving wheel being carried at one end by a suspension arrangement, the opposite end of which is connected to the lower end of a substantially vertically displaceable column connected to the frame of the apparatus.

Such a spreading apparatus with a velocity sensing driving wheel is known for instance from German Offenlegungsschrift No. 2,830,056.

When the material container no longer contains material, it is desired that the driving wheel is automatically raised.

A spreading apparatus of the type mentioned in the introduction of the specification is according to the invention characterized by the hydraulic power for the hydraulic motors of the dosing device and the spreading disc as well as the pressure for a hydraulic cylinder varying the pressure of the driving wheel against the roadway being produced by a wheel pump coupled to the driving wheel, and by the hydraulic cylinder being adapted to reduce the wheel pressure against the roadway and optionally to lift the driving wheel off said roadway as a consequence of a reduction in pressure in the hydraulic system by relieving the hydraulic motors. In this manner the pressure is reduced when the delivery rollers are no longer loaded. As a result the wheel can be raised automatically relative to the roadway when the spreading is disengaged or when the material container is empty. An unnecessary operation of the machinery is thereby automatically avoided.

According to a particularly advantageous embodiment the suspension arrangement for the wheel may comprise a parallelogram suspension, in which the cylinder with a displaceable piston is placed as a diagonal.

Figure 2:
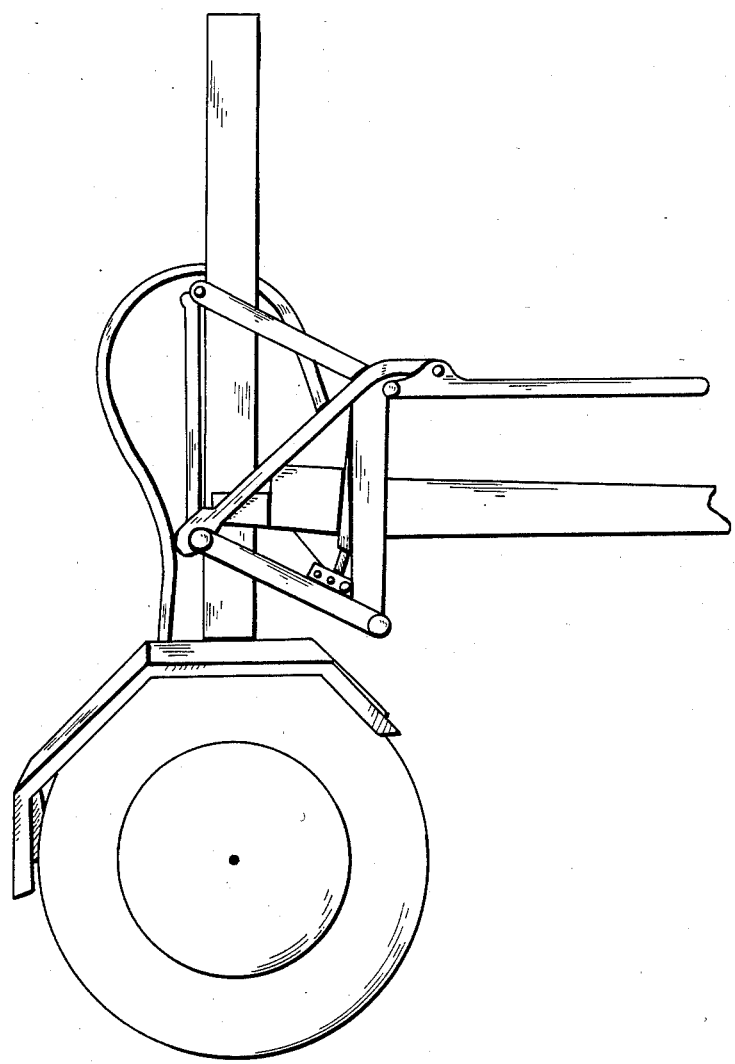
Figure 3:
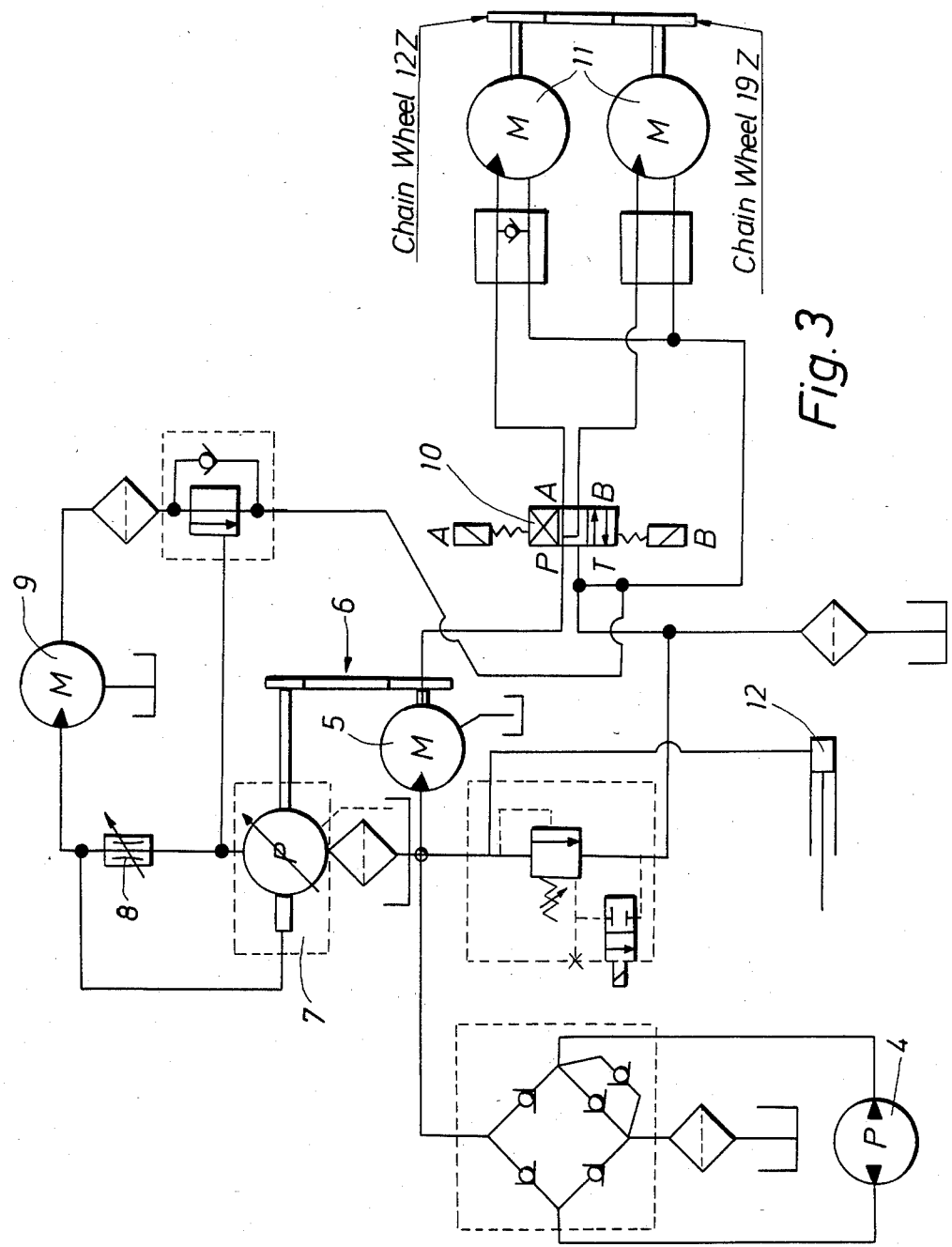
Figure 4:
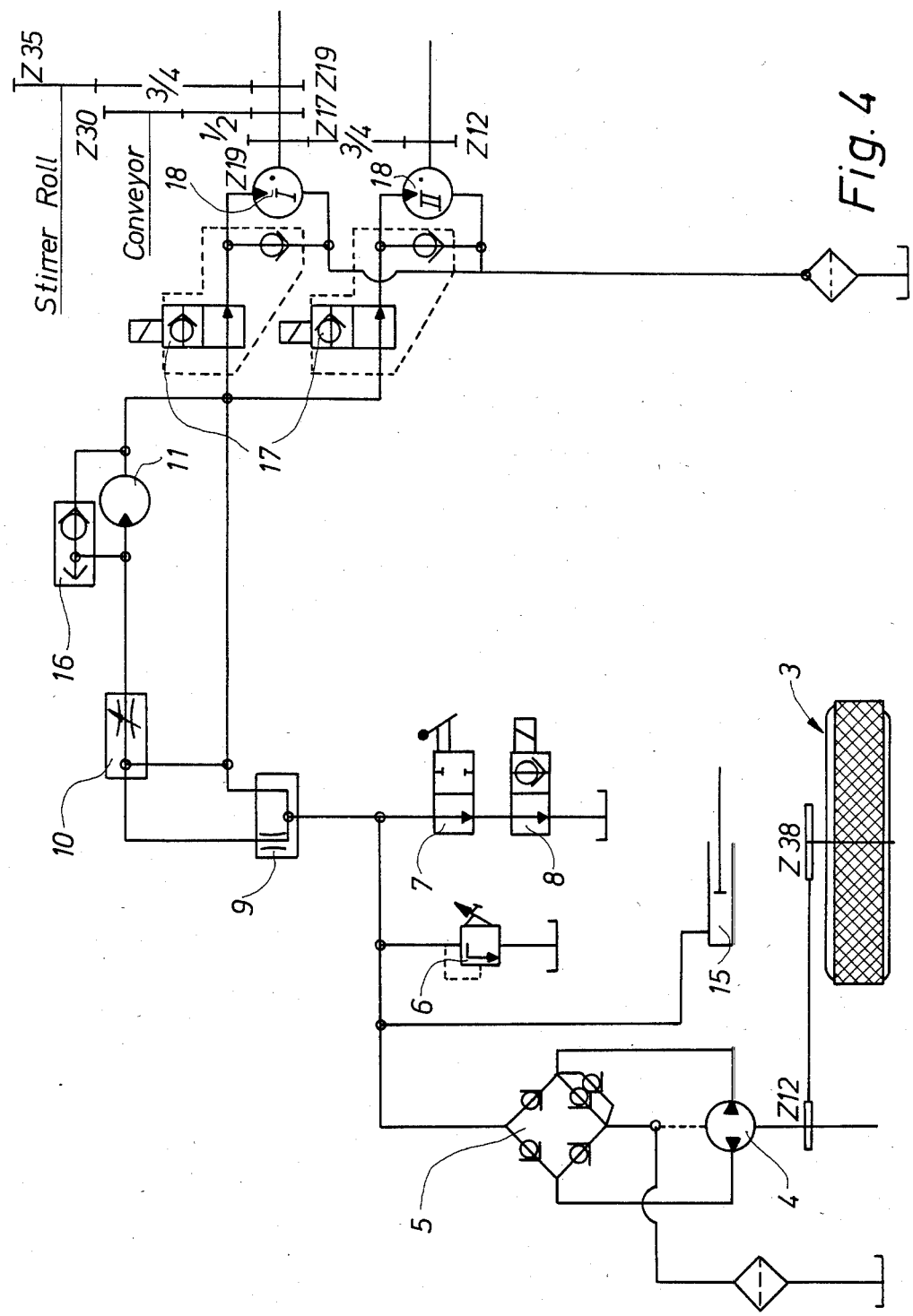
Figure 5:
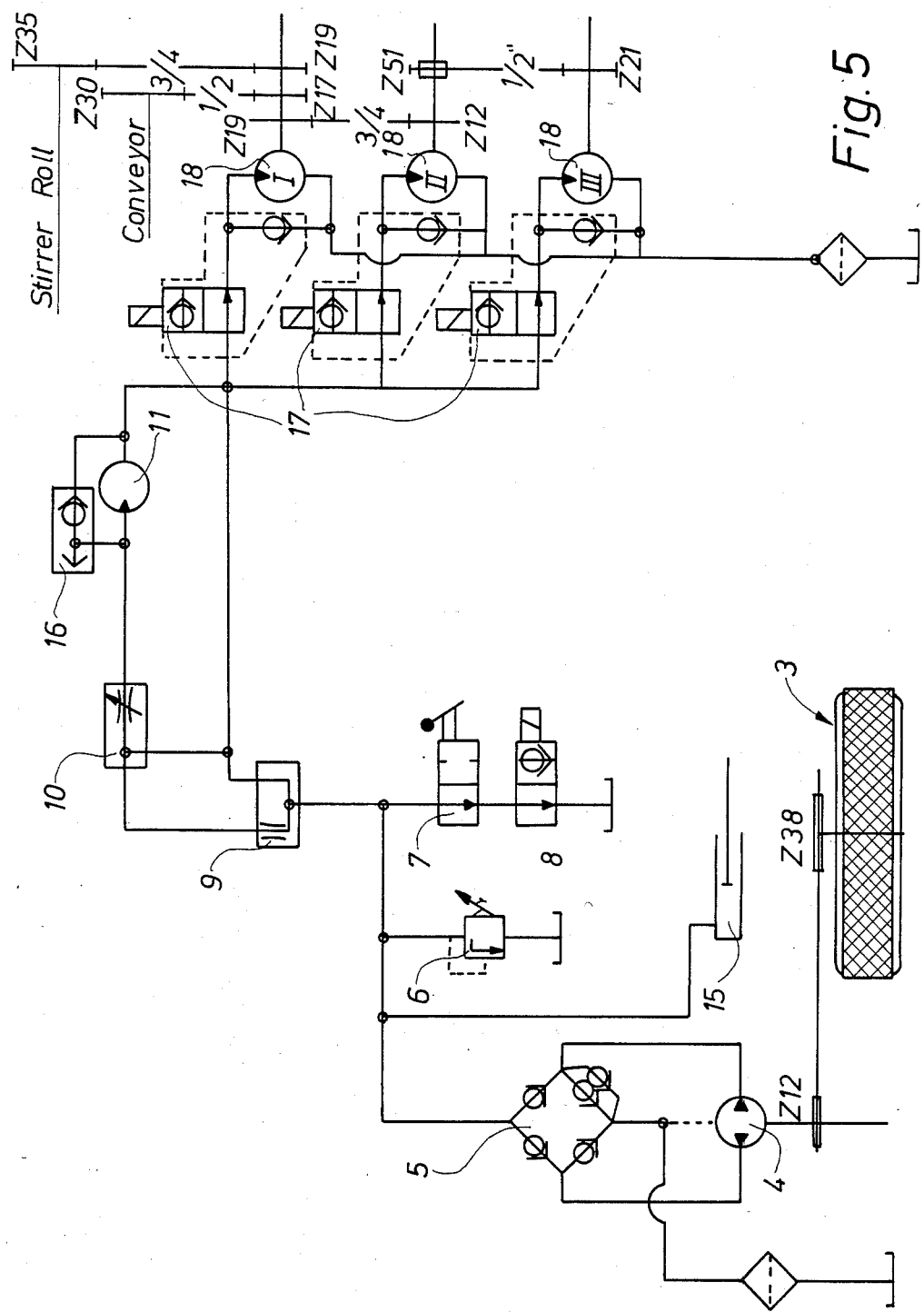
Figure 6:
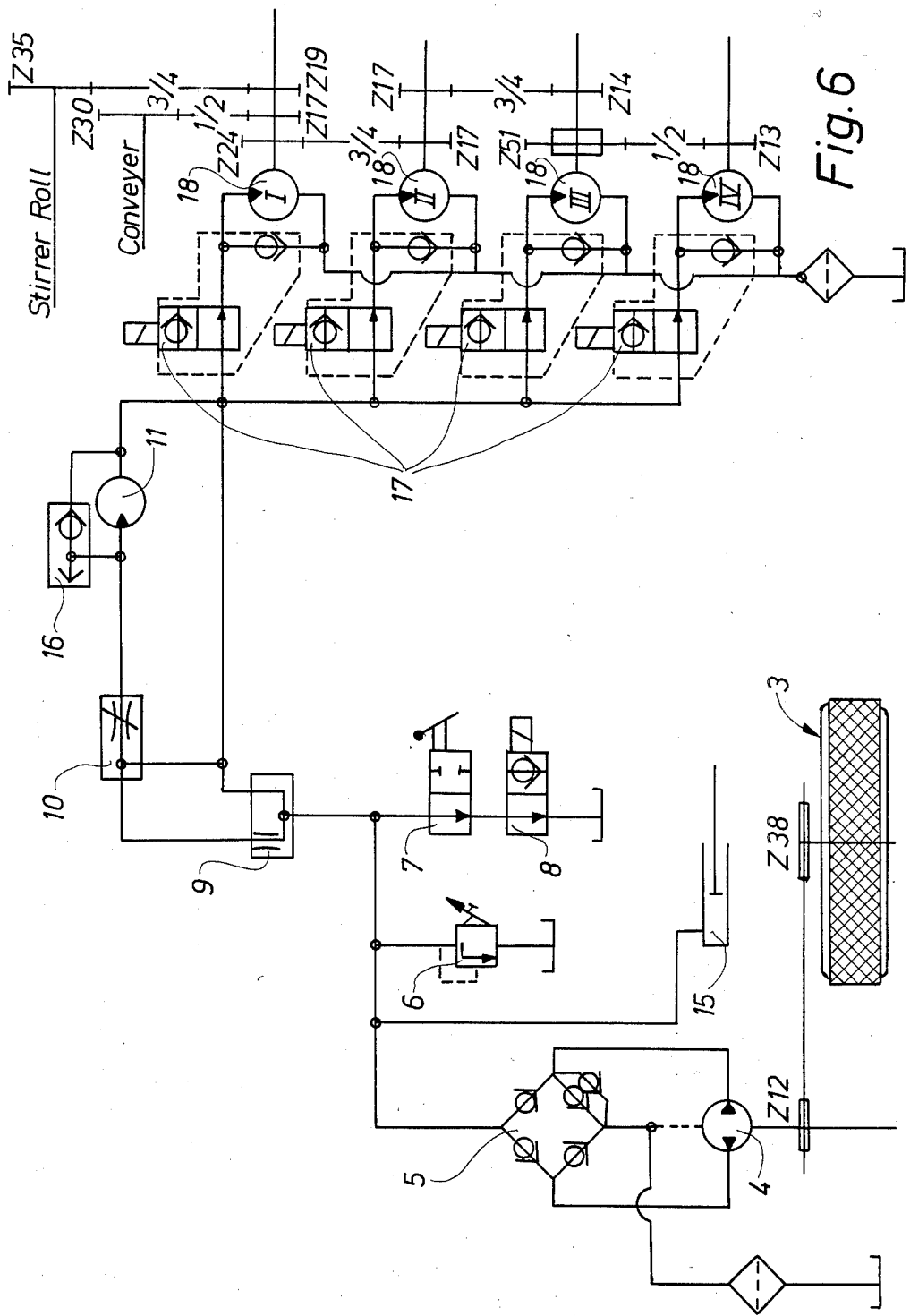

The invention will be described below with reference to the accompanying drawing, in which FIG. 1 illustrates a spreading apparatus to be placed on a vehicle and comprising a velocity sensing driving wheel, FIG. 2 illustrates a particularly advantageous suspension arrangement for the driving wheel, FIG. 3 illustrates a hydraulic system coupled to the driving wheel, FIG. 4 illustrates the hydraulic circuits of a spreading apparatus with two hydraulic motors, FIG. 5 illustrates a hydraulic circuit with three hydraulic motors, and FIG. 6 illustrates a hydraulic circuit with four hydraulic motors.

FIG. 1 illustrates a spreading apparatus which as indicated may be placed on a truck. A material container 1 is situated on permanent frames. The material from the container 1 is distributed by means of a stirrer roll in the container, whereafter it proceeds to a dosing device situated underneath it. From the dosing device the material is fed to a conveyor 14 transporting it to the rear end of the frame, from which it is distributed through a spreading disc 2.

A driving wheel 3 drives the stirrer roll, the dosing device, and the spreading disc 2, said driving wheel being placed at the rear end of the vehicle and being capable of being pressed against the roadway. At one end the driving wheel 3 is carried by a suspension arrangement, the opposite end of which is connected to the lower end of a substantially vertically displaceable column 13 communicating with the frame of the apparatus.

A hydraulic wheel pump 4, cf. FIG. 3, is connected to the driving wheel of the apparatus according to the invention. This wheel pump feeds an amount of liquid per time unit which is proportional to the driving velocity to a hydraulic motor 5, which in turn drives the spreading disc 2 through chain wheels 6, a pump 7 having a variable displacement, an adjustable valve 8, and a motor 9, at a velocity which should be independent of the velocity of the vehicle, and which as far as possible should be constant. Furthermore, the liquid is fed to a multiway valve 10 driving one or several hydraulic motors 11. These hydraulic motors drive the delivery roller and the stirrer roll at a velocity proportional to the velocity of the vehicle. If the container 1 is empty, the motors are almost unloaded, and the liquid pressure is thereby reduced correspondingly. The principle is now that this liquid pressure is also fed to a piston in a cylinder 12, which as long as the pressure exists presses the driving wheel 3 towards the roadway. This cylinder 12 may optionally imply that the wheel 3 is raised relative to the roadway when the pressure is reduced to a predetermined value.

According to a particularly advantageous embodiment the suspension arrangement for the wheel 3 comprises a parallelogram suspension, cf. FIG. 2, in which the cylinder with the piston at least partially is situated as a diagonal.

Measures have, of course, been taken to ensure in any case that the wheel 3 at start is pressed towards the roadway until the pressure is established as a consequence of the load at the rotation of the wheel.

A hydraulic wheel pump 24 is connected to the driving wheel 23, cf. FIG. 4 illustrating a hydraulic circuit. This wheel pump 24 communicates through a rectifier valve 25 with a cylinder 35 capable of keeping the driving wheel 23 in contact with the roadway. Furthermore a pressure valve 26, a manual decoupling valve 27, and a decoupling valve 28 controlled by a solenoid are provided. 29 is a unit providing a constant flow, said unit feeding the first nine liters of oil to the valve 30 which does not tolerate too much oil. From the valve 30, oil is fed to the spreading disc motor 31. 36 is a filling up valve. If the user drives relatively fast in the direction of a corner and stops, no more oil is fed. The inertia in the disc and the valve 36 then implies that it does not suck itself dry. The total amount of oil from the two branches is then fed to valves 37 controlled by a plurality of solenoids, said valves in turn controlling their respective hydraulic motors 38. Two motors appear from the Figure. These motors are interconnected through chain wheels, the wheels comprising teeth 32 and 39, respectively. The principle is now that it is possible to change gear either by coupling one, the other or both motors. The rate of rotation may thereby be varied in the ratio 1:1.58:2.58.

According to an alternative embodiment, cf. FIG. 5, three hydraulic driving motors 38 may be used, the motors being interconnected by means of toothed wheels comprising the stated number of teeth. In response to the selection of valves 37 to be opened it is possible to change the numbers of rotation in the ratios 1:1.58:2.58:3.85:4.85:5.43:6.43.

According to a third embodiment four hydraulic motors 38 may be interconnected by means of toothed wheels comprising the stated number of teeth, cf. FIG. 6. By means of these four hydraulic motors it is possible to obtain fifteen different combinations corresponding to a ratio between the numbers of rotation of 1:1.41:1.71:2.41:2.71:3.12:4.12:6.72:7.72:8.13:8.43:9.13:9.43:9.84:10.84.

According to the invention a hydraulic gear is thus provided which includes a large number of variations and which is relatively easy to control.

The following Table illustrate the solenoids which must be provided with electric current in order to achieve the different gears. By supplying electric current to the solenoid, the valve interrupts the supply of oil to the motor in question.

| Table of Gear Possibilities | | | | | |
|---|---|---|---|---|---|
| 2 motors Electric current to the solenoid associated with the motor No. | | 3 motors Electric current to the solenoid associated with the motor No. | | 4 motors Electric current to the solenoid associated with the motor No. | |
| 1:2.58 | | 1. 1:6.43 | | 1. 1:10.84 | |
| 1:1.58 | I | 2. 1:5.43 | I | 2. 1:9.84 | I |
| 1:1 | II | 3. 1:4.85 | II | 3. 1:9.43 | II |
| | | 4. 1:3.85 | I II | 4. 1:9.13 | III |
| | | 5. 1:2.58 | III | 5. 1:8.43 | I II |
| | | 6. 1:1.58 | I III | 6. 1:8.13 | I III |
| | | 7. 1:1 | II III | 7. 1:7.72 | II III |
| | | | | 8. 1:6.72 | I II III |
| | | | | 9. 1:4.12 | IV |
| | | | | 10. 1:3.12 | I IV |
| | | | | 11. 1:2.71 | II IV |
| | | | | 12. 1:2.41 | III IV |
| | | | | 13. 1:1.71 | I II IV |
| | | | | 14. 1:1.41 | I III IV |
| | | | | 15. 1:1 | II III IV |

I claim:

1. In a spreading apparatus for use on a vehicle: a container for holding spreading material; a dosing device for withdrawing spreading material from the container, said dosing device including at least one driven member in contact with spreading material in the container and a hydraulic motor drivingly connected to said member whereby when the container is empty said motor is essentially unloaded; a driving wheel assembly including a road-engageable driving wheel and an adjustable suspension device for lowering and raising the driving wheel to thereby engage and disengage the driving wheel with the surface of the road, said assembly also including a hydraulic device which when pressurized urges the driving wheel downwardly for engagement with the road; a hydraulic pump drivingly coupled to the drive wheel; and a hydraulic system for conveying hydraulic pressure from said pump to said hydraulic motor to operate said dosing device and to said hydraulic device to urge said driving wheel downwardly during a spreading operation, the hydraulic system being so arranged that, upon unloading of said hydraulic motor as a result of the container becoming empty, the resulting reduced pressure in said hydraulic system reduces the pressure in said hydraulic device thereby reducing the downward urging force on said driving wheel, the arrangement being that the pressure relief of the hydraulic device is thereby effected automatically.

* * * * *